United States Patent
Sakurai et al.

(10) Patent No.: US 10,908,595 B2
(45) Date of Patent: Feb. 2, 2021

(54) FACILITY STATE DETERMINATION DEVICE, FACILITY STATE DETERMINATION METHOD, AND FACILITY MANAGEMENT SYSTEM

(71) Applicant: Hitachi, Ltd., Tokyo (JP)

(72) Inventors: Yuichi Sakurai, Tokyo (JP); Masaaki Maeda, Tokyo (JP); Masayoshi Takahashi, Tokyo (JP); Hideo Sakai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 16/396,093

(22) Filed: Apr. 26, 2019

(65) Prior Publication Data

US 2019/0384268 A1 Dec. 19, 2019

(30) Foreign Application Priority Data

Jun. 18, 2018 (JP) ................................ 2018-115343

(51) Int. Cl.
G05B 19/418 (2006.01)

(52) U.S. Cl.
CPC ..... G05B 19/41825 (2013.01); G05B 19/4184 (2013.01); G05B 2219/31093 (2013.01);
(Continued)

(58) Field of Classification Search
CPC .......... G05B 19/41825; G05B 19/4184; G05B 2219/31093; G05B 2219/32179;
(Continued)

(56) References Cited

U.S. PATENT DOCUMENTS

| 6,594,589 B1 * | 7/2003 | Coss, Jr. ............ G05B 19/4184 702/34 |
| 2006/0036403 A1 * | 2/2006 | Wegerich ........... G06K 9/00536 702/183 |

(Continued)

FOREIGN PATENT DOCUMENTS

| JP | 2004-070424 A | 3/2004 |
| WO | 2017/090098 A1 | 6/2017 |
| WO | 2018/030033 A1 | 2/2018 |

OTHER PUBLICATIONS

Extended European Search Report for related Eurpoean Application No. 19172859.1, dated Nov. 27, 2019 (10 pages).

*Primary Examiner* — Christopher E. Everett
(74) *Attorney, Agent, or Firm* — Procopio, Cory, Hargreaves & Savitch LLP

(57) ABSTRACT

A device includes a catalog storage unit that stores a catalog having versatility; a catalog control unit that specifies the catalog corresponding to a target machine tool to be subjected to state determination based on machine tool information including an item of facility type and acquires the catalog from the catalog storage unit; a feature quantity extraction unit that extracts a feature quantity from sensor data detected from the target machine tool; a sensor data processing unit that performs state determination of the target machine tool based on the feature quantity distribution included in the acquired catalog and the feature quantity extracted from the sensor data; a feature quantity tuning unit that performs tuning of the feature quantity distribution by mapping the extracted feature quantity to the feature quantity distribution; and a catalog updating unit that updates the catalog based on the feature quantity distribution after tuning.

11 Claims, 8 Drawing Sheets

(52) U.S. Cl.
CPC .............. *G05B 2219/32179* (2013.01); *G05B 2219/35086* (2013.01)

(58) Field of Classification Search
CPC ........... G05B 2219/35086; G05B 2219/33034; G05B 23/0224; G05B 2219/31485; G05B 2219/31455; G05B 2219/31483; G05B 19/4063; Y02P 90/02
See application file for complete search history.

(56) References Cited

U.S. PATENT DOCUMENTS

| | | | |
|---|---|---|---|
| 2018/0032064 A1* | 2/2018 | Fang | ................ G05B 19/41855 |
| 2018/0164781 A1 | 6/2018 | Kubo et al. | |
| 2019/0210176 A1* | 7/2019 | Yamamoto | ......... G05B 13/0265 |

* cited by examiner

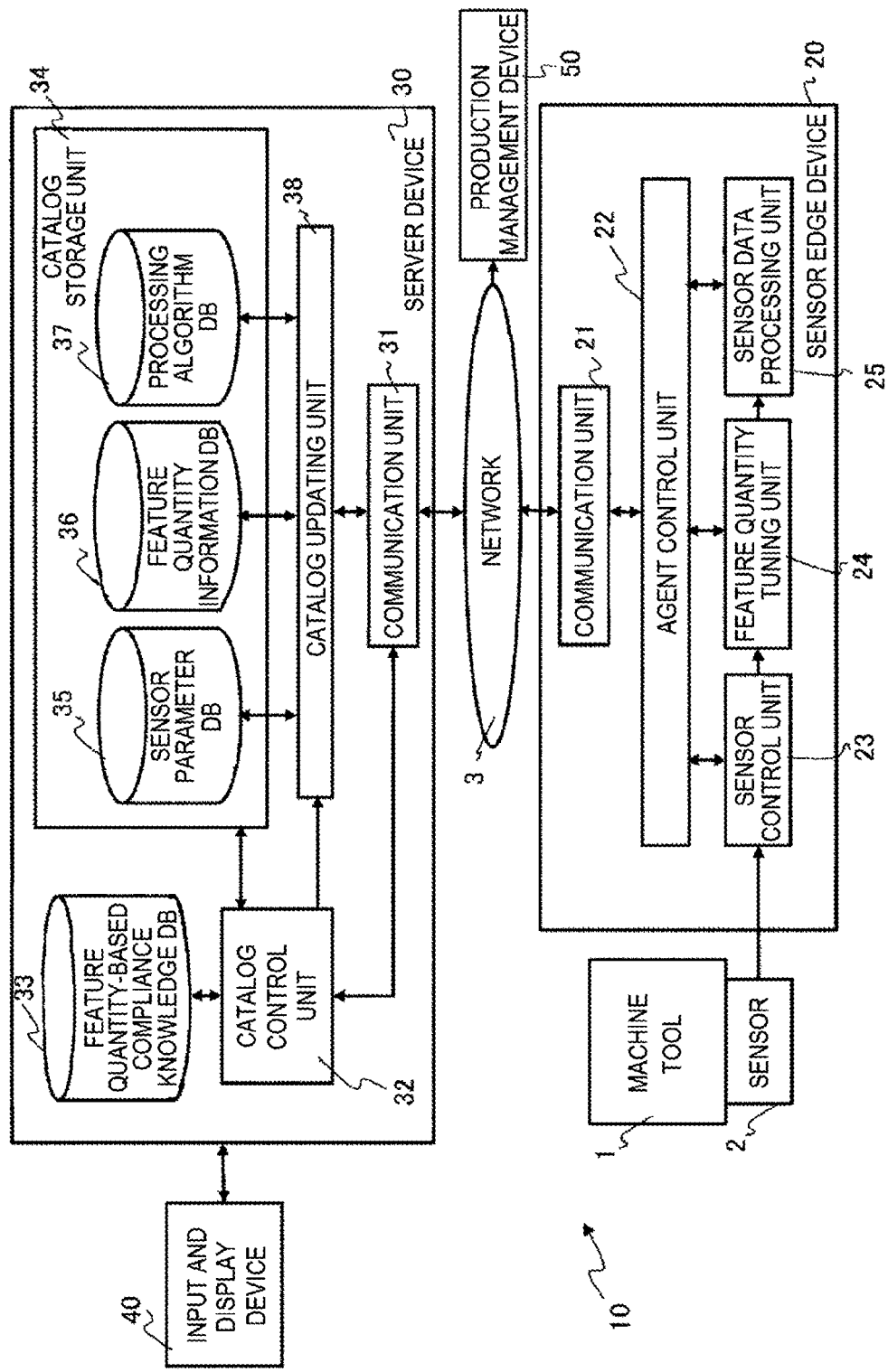
[FIG. 1]

[FIG. 2A]
| 100 | VALUE |
|---|---|
| SENSOR TYPE | CURRENT |
| LOAD RESISTANCE | 100Ω |
| SAMPLING PERIOD | 10KSa/s |
| ⋮ | ⋮ |
[FIG. 2B]
| 100 | VALUE |
|---|---|
| SENSOR TYPE | VIBRATION |
| LOAD RESISTANCE | — |
| SAMPLING PERIOD | 10Sa/s |
| ⋮ | ⋮ |
[FIG. 3]
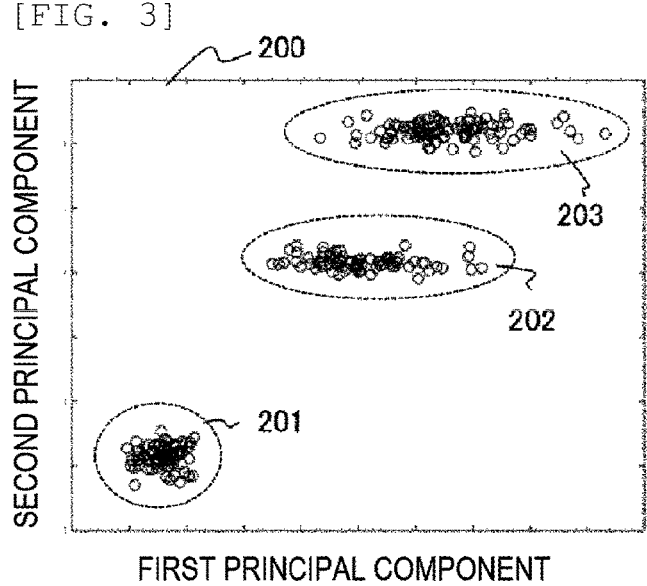

[FIG. 4A]

| ITEM | VALUE |
|---|---|
| STATE DETERMINATION | OPERATING STATE IDENTIFICATION |
| ALGORITHM NAME | GMM |
| PROGRAM NAME | GMM |

[FIG. 4B]

| ITEM | VALUE |
|---|---|
| STATE DETERMINATION | OPERATING STATE IDENTIFICATION |
| ALGORITHM NAME | K-means |
| PROGRAM NAME | K-means |

[FIG. 4C]

| ITEM | VALUE |
|---|---|
| STATE DETERMINATION | ABNORMALITY DETECTION |
| ALGORITHM NAME | SVM |
| PROGRAM NAME | SVM |

[FIG. 4D]

| ITEM | VALUE |
|---|---|
| STATE DETERMINATION | FAILURE SIGN DETECTION |
| ALGORITHM NAME | ALGORITHM C |
| PROGRAM NAME | ALGORITHM C |

[FIG. 5A]
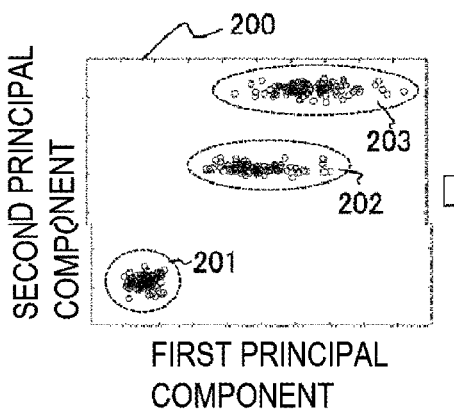

[FIG. 5B]
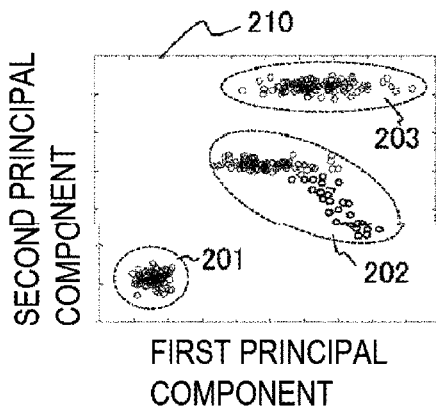

| SPECIFICATION | VALUE |
|---|---|
| FACILITY TYPE | MILLING MACHINE |
| MANUFACTURER | ABC MACHINERY |
| PROCESSING TIME | 13:30:25 |
| WORK MATERIAL | STAINLESS |
| TEMPERATURE | 25°C |
| HUMIDITY | 60% |

[FIG. 7]

| FACILITY TYPE | FEATURE QUANTITY DISTRIBUTION | PROCESSING ALGORITHM INFORMATION |
|---|---|---|
| MACHINING CENTER | (Second Principal Component vs First Principal Component) | OPERATING STATE IDENTIFICATION GMM |
| DRILLING MACHINE | (Second Principal Component vs First Principal Component) | OPERATING IDENTIFICATION INFORMATION K-means GMM |
| TURNING CENTER | (Second Principal Component vs First Principal Component) | FAILURE SIGN DETECTION ALGORITHM C |
| ... | | |

500

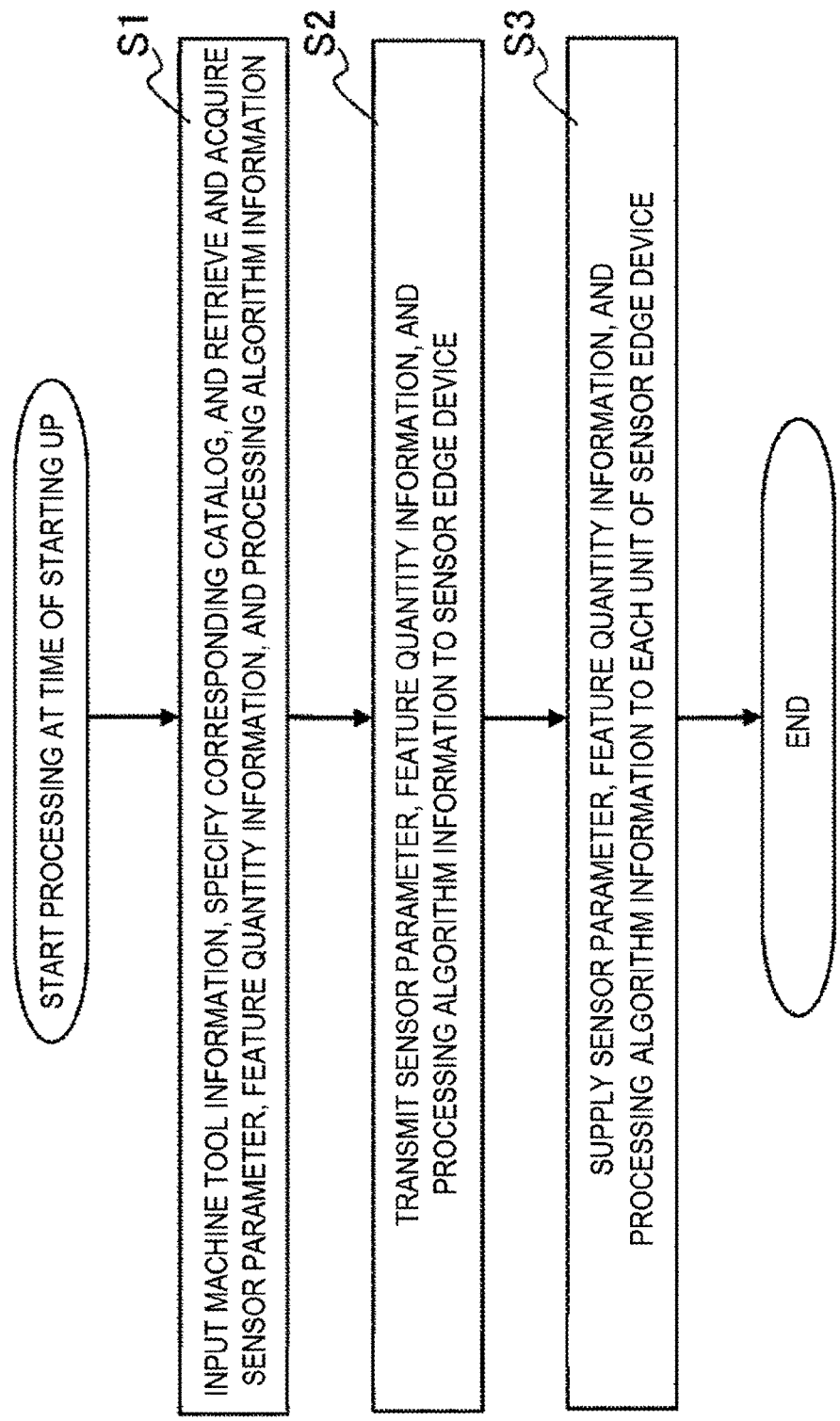
[FIG. 8]

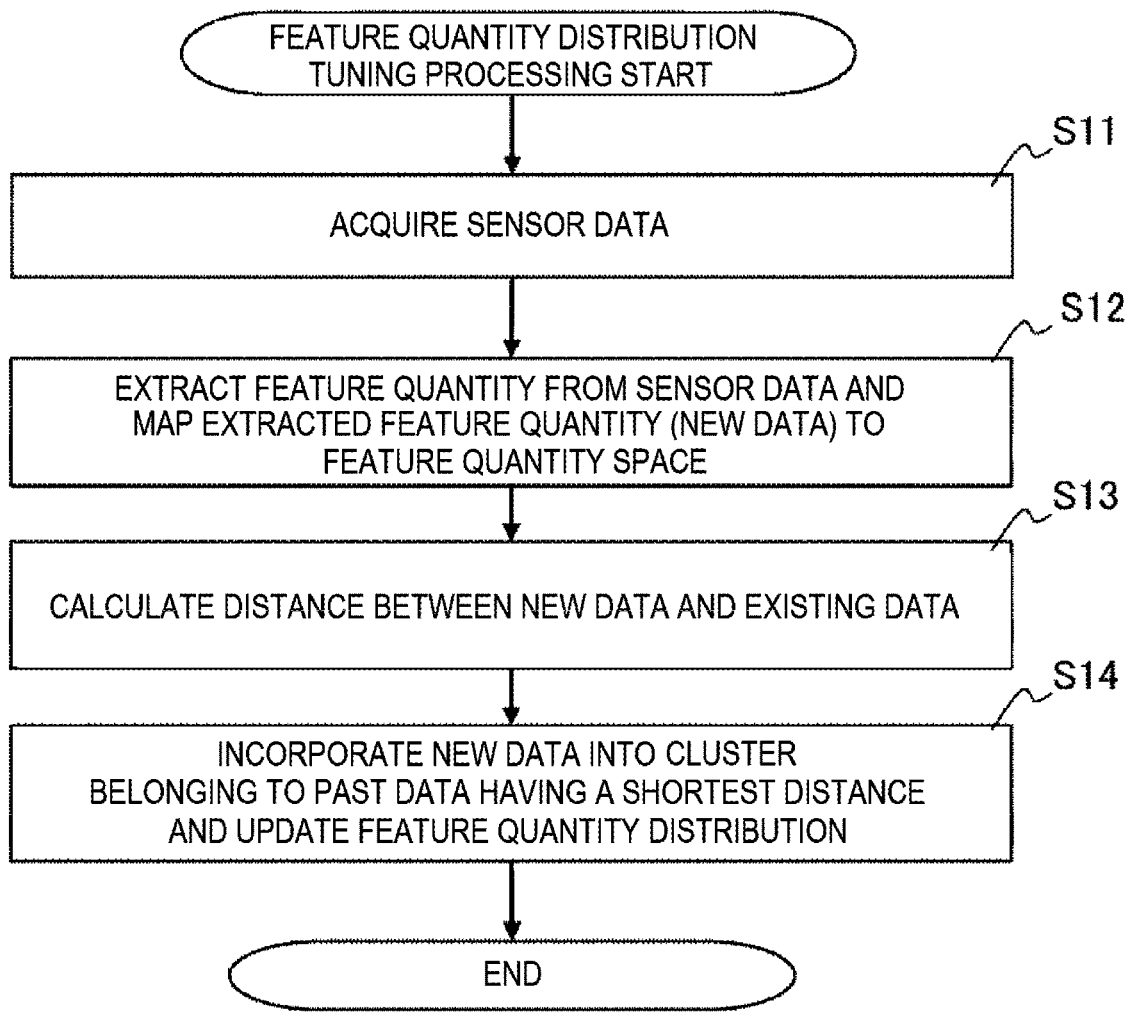

[FIG. 10]
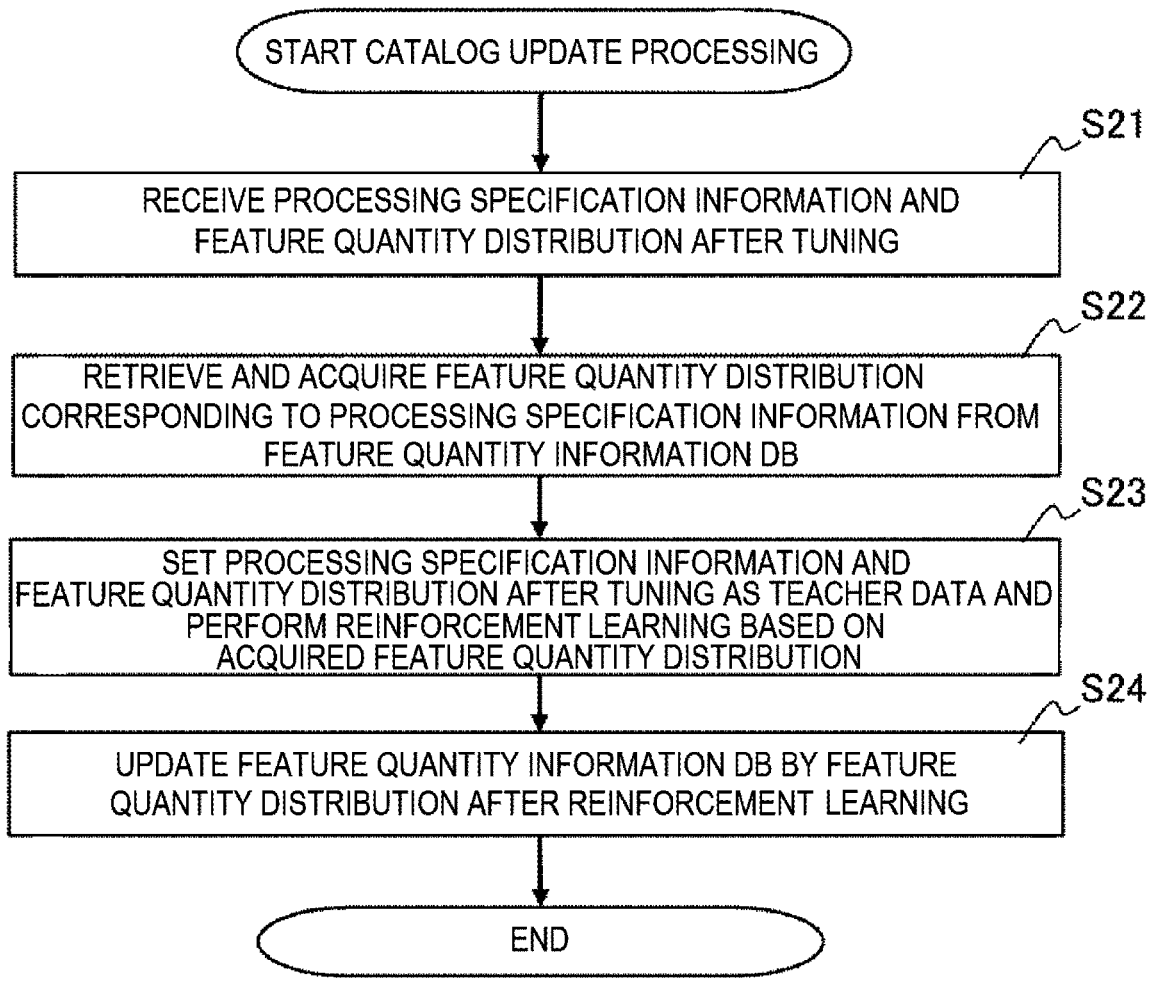
[FIG. 11A]
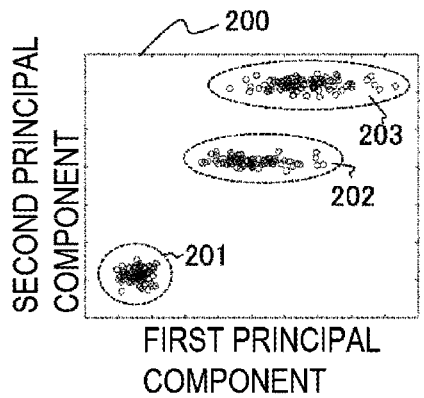
[FIG. 11B]
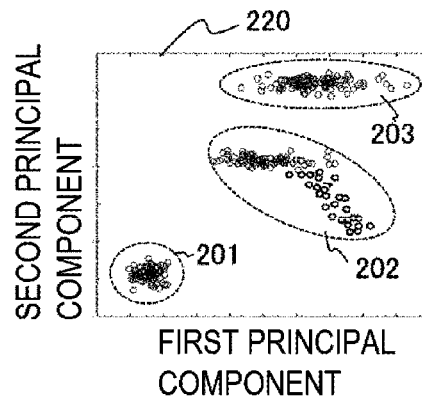

FACILITY STATE DETERMINATION DEVICE, FACILITY STATE DETERMINATION METHOD, AND FACILITY MANAGEMENT SYSTEM

TECHNICAL FIELD

The present invention relates to a facility state determination device, a facility state determination method, and a facility management system.

BACKGROUND ART

For example, in order to perform efficient production management in a factory, it is necessary to identify and aggregate operating state of each machine tool installed in the factory. As a technique for identifying and aggregating the operating state of a machine tool, for example, Patent Literature 1 discloses an operating information collection system of a machine tool "including an operating state measuring unit that measures an operation signal specifying the operating state of the machine tool in real time; a determination criterion setting unit that, based on a model, sets a characteristic of the operation signal for each category according to the operating state in advance as a determination criterion; a determination unit that determines the operating state by comparing the category-based operating state with the determination criterion according to a characteristic of a measuring signal in each category of an operating state corresponding to a model of a machine tool to be measured by the operating state measuring unit; and an operating information collection unit that stocks a determination result by the determination unit as each category-based operating information."

PRIOR ART LITERATURE

Patent Literature

PTL 1: JP-A-2004-070424

SUMMARY OF INVENTION

Technical Problem

In the operating information collection system of the machine tool described in Patent Literature 1, an operating state is determined using a determination criterion prepared in advance for each model of a machine tool (hereinafter, also referred to as facility). However, even if the facility is of the same model, if an installation location, a processing type, a work material, and the like are different, a difference also occurs in an operation signal detected from the facility. Therefore, it may not be possible to accurately determine the operating state of the facility when using the determination criterion prepared in advance for each model.

A method of preparing a determination criterion in advance for each combination of various conditions such as the model, the installation location, the processing type, and the work material of the facility is also conceivable. However, a number of combinations of the conditions described above are large, and it is not realistic to prepare determination criteria for each combination of conditions in advance.

The invention has been made in view of such a situation, and an object thereof is to make it possible to accurately determine a state of a facility under various conditions.

Solution to Problem

The present application includes a plurality of means for solving at least a part of the problems described above, but examples thereof are as follows. In order to solve the above problems, a facility state determination device according to an aspect of the invention includes a catalog storage unit that stores a catalog having versatility for machine tools of the same facility type; a catalog control unit that specifies the catalog corresponding to a target machine tool to be subjected to state determination based on machine tool information including at least the item of the facility type and acquires the catalog from the catalog storage unit; a feature quantity extraction unit that extracts a feature quantity from sensor data detected from the target machine tool; a sensor data processing unit that performs the state determination of the target machine tool based on feature quantity distribution included in the acquired catalog and the feature quantity extracted from the sensor data; a feature quantity tuning unit that performs tuning of the feature quantity distribution by mapping the feature quantity extracted from the sensor data to the feature quantity distribution; and a catalog updating unit that updates the catalog stored in the catalog storage unit based on the feature quantity distribution after tuning.

Advantageous Effect

According to the invention, it is possible to accurately determine the state of the facility under various conditions.

Problems, configurations, and effects other than those described above will become apparent from the following description of the embodiments.

BRIEF DESCRIPTION OF DRAWINGS

FIG. 1 is a block diagram showing a configuration example of a facility management system according to an embodiment of the invention.

FIGS. 2(A)-2(B) are diagrams showing examples of a sensor parameter.

FIG. 3 is a diagram showing a feature quantity distribution as feature quantity information.

FIGS. 4(A)-4(D) are diagrams showing examples of processing algorithm information.

FIGS. 5(A)-5(B) are diagrams showing examples of the feature quantity distribution before and after tuning.

FIG. 6 is a diagram showing an example of processing specification information.

FIG. 7 is a diagram showing an example of a relationship table stored in a feature quantity-based compliance knowledge DB.

FIG. 8 is a flowchart illustrating an example of processing at the time of starting up.

FIG. 9 is a flowchart illustrating an example of feature quantity distribution tuning processing.

FIG. 10 is a flowchart illustrating an example of a catalog update processing.

FIGS. 11(A)-11(B) are diagrams showing examples of the feature quantity distribution before and after tuning.

DESCRIPTION OF EMBODIMENTS

An embodiment according to the invention will be described below with reference to the drawings. The same components are generally denoted by the same reference symbols throughout all the drawings for describing the embodiments, and the repetitive description thereof will be omitted. Further, in the embodiment described below, it is needless to say that the constituent elements (including element steps) are not always indispensable unless otherwise stated or except a case where the components are considered to be apparently indispensable in principle. Further, it is needless to say that expressions "formed of A", "made of A", "having A", and "including A" do not exclude elements other than A unless otherwise stated that A is the only element thereof. Similarly, in the following embodiment, when the shape, positional relationship, or the like of the constituent elements or the like are described, the substantially approximate and similar shapes and the like are included therein unless otherwise stated or except a case where it is conceivable that they are apparently excluded in principle.

<Configuration Example of Facility Management System According to Embodiment of Invention>

The facility management system according to an embodiment of the invention is for realizing efficient production management in a factory by, for example, performing state determination of each of a plurality of machine tools (hereinafter also referred to as facilities) installed in the factory and aggregating determination results thereof.

FIG. 1 shows a configuration example of a facility management system according to an embodiment of the invention. The facility management system 10 includes a sensor edge device 20, a server device 30, an input and display device 40, and a production management device 50. Note that, although a plurality of sensor edge devices 20 are present, only one sensor edge device 20 is illustrated in the same drawing.

The sensor edge device 20 is provided corresponding to each of a plurality of machine tools 1 subjected to state determination and installed in the factory or the like. The sensor edge device 20 performs the state determination of the machine tool 1 based on sensor data from a sensor 2 attached to the machine tool 1, and transmits a determination result thereof to a production management device 50 via a network 3. Note that, the state determination of the machine tool 1 by the sensor edge device 20 includes at least one of operating state identification, abnormality detection, and failure sign detection.

Further, the sensor edge device 20 communicates predetermined data with the server device 30 via the network 3.

The sensor edge device 20, together with the server device 30, corresponds to a facility state determination device of the invention.

Examples of a facility type of the machine tool 1 include, for example, a milling machine, a drilling machine, a machining center, and a turning center.

The milling machine can perform milling on a work material. The drilling machine can perform drilling on the work material. The machining center can perform milling, boring, drilling, screwing, and the like on the work material by automatically changing a cutting tool. The turning center can perform milling, drilling, and the like while rotating the work material.

Therefore, examples of the processing type of the machine tool 1 include cutting, drilling, milling, boring, and screwing.

The sensor 2 functions as an ammeter, a vibration meter, a thermometer, a noise meter, and the like according to a setting from the sensor edge device 20. That is, the sensor 2 can measure current consumption, vibration, temperature, sound, and the like of the machine tool 1, and output sensor data obtained as a measurement result to the sensor edge device 20.

The network 3 is a bidirectional communication network represented by, for example, a Local Area Network (LAN), a Wide Area Network (WAN), the Internet, and a mobile phone communication network.

The sensor edge device 20 includes a communication unit 21, an agent control unit 22, a sensor control unit 23, a feature quantity tuning unit 24, and a sensor data processing unit 25. Note that, the sensor edge device 20 can be realized by an edge computer including a Central Processing Unit (CPU), a Random Access Memory (RAM), a Read Only Memory (ROM), a communication I/F, and the like.

The communication unit 21 connects and communicates with the server device 30 and the production management device 50 via the network 3 by wired communication or predetermined wireless communication.

The agent control unit 22 integrally controls each unit configuring the sensor edge device 20. In addition, the agent control unit 22 acquires a catalog transmitted from the server device 30 via the communication unit 21.

Here, the catalog is information that having versatility for the machine tools 1 of the same facility type, and is a combination of a sensor parameter 100 (FIGS. 2(A)-2(B)), feature quantity information 200 (FIG. 3), and processing algorithm information 300 (FIGS. 4(A)-4(D)). The catalog is generated in advance and stored in a catalog storage unit 34 of the server device 30.

The agent control unit 22 supplies the sensor parameter 100 included in the catalog to the sensor control unit 23, supplies the feature quantity information 200 to the feature quantity tuning unit 24, and supplies the processing algorithm information 300 to the sensor data processing unit 25.

Here, the sensor parameter 100, the feature quantity information 200, and the processing algorithm information 300 will be described.

FIGS. 2(A)-2(B) show examples of the sensor parameter 100. In the sensor parameter 100, a sensor type, a load resistance to be used, a suitable sampling period, and the like are provided as items. FIG. 2(A) shows an example of the sensor parameter 100 when the sensor 2 is caused to function as an ammeter. FIG. 2(B) shows an example of the sensor parameter 100 when the sensor 2 is caused to function as a vibration meter.

FIG. 3 shows an example of feature quantity distribution as the feature quantity information 200. Hereinafter, the feature quantity distribution as the feature quantity information 200 is referred to as feature quantity distribution 200.

The feature quantity distribution 200 is obtained by mapping each feature quantity to a two-dimensional space having a horizontal axis as a first principal component of the feature quantity and a vertical axis as a second principal component of the feature quantity. In a case of the same drawing, a plurality of feature quantities mapped to a two-dimensional space is classified into any of three clusters 201 to 203. Each cluster is labeled in a different operating state of the machine tool 1.

For example, the clusters 201 to 203 are respectively labeled in any one of a stopped state (for example, a state in which the cutting tool is not rotating), an idling state (for example, a state in which the cutting tool is rotating but the work material is not being cut), or a cutting state (for example, a state in which the cutting tool is rotating and the work material is being cut) of the machine tool 1.

FIGS. 4(A)-4(D) show examples of the processing algorithm information 300. In the processing algorithm information 300, state determination, an algorithm name, a program name, and the like are provided as items related to clustering of the feature quantities. FIG. 4(A) shows an example of the processing algorithm information 300 when the operating state identification is performed as the state determination. FIG. 4(B) shows an example of the processing algorithm information 300 when the operating state identification is performed as the state determination. FIG. 4(C) shows an example of the processing algorithm information 300 when the abnormality detection is performed as the state determination. FIG. 4(D) shows an example of the processing algorithm information 300 when the failure sign detection is performed as the state determination.

Note that, in the present embodiment, in addition to an existing general processing algorithm such as a Gaussian Mixture Model (GMM), a K-means, and a support vector machine (SVM), a processing algorithm (such as algorithm C in FIG. 4(D)) independently developed and defined by each user can be used.

Return to FIG. 1. Furthermore, the agent control unit 22 outputs the result of the state determination by the sensor data processing unit 25 and a corresponding timestamp to the communication unit 21 and transmits the result and the timestamp to the production management device 50.

Further, the agent control unit 22 acquires a feature quantity distribution 210 (FIG. 5(B)) after tuning held by the feature quantity tuning unit 24 at a predetermined timing, and acquires processing specification information 400 (FIG. 6) related to the machine tool 1 from the sensor control unit 23. Then, the agent control unit 22 outputs the acquired feature quantity distribution 210 after tuning and the processing specification information 400 to the communication unit 21 and transmits the acquired feature quantity distribution 210 and the processing specification information 400 to the server device 30.

The sensor control unit 23 sets the sensor 2 attached to the machine tool 1 based on the sensor parameter 100 from the server device 30. Further, the sensor control unit 23 acquires sensor data detected by the sensor 2 from the machine tool 1 and outputs the acquired sensor data to the feature quantity tuning unit 24. Further, the sensor control unit 23 acquires the processing specification information 400 from the machine tool 1 via the sensor 2 in response to a request from the agent control unit 22.

The feature quantity tuning unit 24 corresponds to a feature quantity extraction unit and a feature quantity tuning unit of the invention. The feature quantity tuning unit 24 holds the feature quantity distribution 200 from the server device 30. Further, the feature quantity tuning unit 24 tunes the held feature quantity distribution 200 and replaces the feature quantity distribution 200 with the feature quantity distribution 210 after tuning (FIGS. 5(A)-5(B)).

Further, the feature quantity tuning unit 24 performs predetermined signal processing (for example, First Fourier Transport (FFT)) on the sensor data input from the sensor control unit 23 to calculate a feature quantity, and further performs Principal Component Analysis (PCA) processing, thereby reducing a number of dimensions of the feature quantity. Accordingly, the feature quantity tuning unit 24 extracts a feature quantity having a component of at least two or more dimensions. Note that, the type of the feature quantity extracted by the feature quantity tuning unit 24 is not particularly limited. For example, the feature quantity tuning unit 24 may extract the feature quantity that changes in time series based on sensor data accompanying a time series change.

Further, the feature quantity tuning unit 24 calculates a distance between a feature quantity (new data) extracted from the sensor data and each feature quantity (past data) mapped to the held feature quantity distribution 200 (or feature quantity distribution 210), and outputs the calculation result to the sensor data processing unit 25.

Further, the feature quantity tuning unit 24 tunes the feature quantity distribution 200 by sequentially adding the new data to the held feature quantity distribution 200 so as to be mapped, and replaces the feature quantity distribution 200 to be held with the feature quantity distribution 210 after tuning. Further, the feature quantity tuning unit 24 supplies the held feature quantity distribution 210 after tuning to the agent control unit 22 in response to the request from the agent control unit 22.

FIGS. 5(A)-5(B) show examples of feature quantity distribution before and after tuning. FIG. 5(A) shows an example of the feature quantity distribution 200 before tuning included in the catalog supplied from the server device 30. FIG. 5(B) shows the feature quantity distribution 210 after tuning by the feature quantity tuning unit 24.

It can be seen that an area of the cluster 202 in the feature quantity distribution 210 shown in FIG. 5(B) is increased, as compared with the feature quantity distribution 200 shown in FIG. 5(A). The increase in the area of the cluster 202 follows the case where an individual difference of the corresponding machine tool 1 or the sensor data detected from the machine tool 1 changes dynamically even during the same operating state.

Here, a situation in which the sensor data dynamically changes even during the same operating state refers to a case where, for example, a turning center is cutting with constant peripheral speed control. In this case, as the work material is cut and a diameter thereof becomes smaller, a rotational speed of a motor for rotating the work material increases, such that the sensor data changes. Further, for example, in a case where rough cutting is gradually shifted to finishing, even if the rotational speed of the motor for rotating the work material is constant, the sensor data changes since torque of the motor decreases.

If the feature quantity distribution 210 after tuning is used for the state determination of the machine tool 1, determination accuracy can be improved as compared with the case where the feature quantity distribution 200 before tuning is used.

Return to FIG. 1. The sensor data processing unit 25 performs clustering on the new data in the feature quantity distribution 200 or 210 based on the distance between the new data and the past data input from the feature quantity tuning unit 24 using the processing algorithm specified in the processing algorithm information 300 from the server device 30. Further, the sensor data processing unit 25 performs labeling (operating state identification) on the cluster to which the new data belongs, and outputs the determination result and the timestamp representing the sampling time of original sensor data from which the new data is extracted to the agent control unit 22.

FIG. 6 shows an example of the processing specification information 400 which is related to the machine tool 1 and transmitted to the server device 30 together with the feature quantity distribution 210 after tuning by the agent control unit 22.

In the processing specification information 400, a facility type, a manufacturer, a processing time, a work material, temperature, humidity, and the like are provided as items. Note that, although not shown in the drawings, in addition to the items described above, items such as a cutting tool and rotation speed of the motor for rotationally driving the cutting tool or the work material may be added.

Note that, in the feature quantity distribution 210 after tuning, new data which is separated from the past data at a distance so as not to be incorporated into the existing clusters 201 to 203 may be added. In this case, items of a newly added facility are added to the processing specification information 400 and transmitted to the server device 30.

The feature quantity distribution 210 after tuning and the processing specification information 400 are used to update the feature quantity information (feature quantity distribution) 200 held in a feature quantity information DB 36 and to update a relationship table 500 held in a feature quantity-based compliance knowledge DB 33 in the server device 30.

Return to FIG. 1. The server device 30 is for supplying a catalog including the sensor parameter 100, the feature quantity information (feature quantity distribution) 200, and the processing algorithm information 300 to the sensor edge device 20. The server device 30, together with the sensor edge device 20, corresponds to the facility state determination device of the invention.

The server device 30 includes a communication unit 31, a catalog control unit 32, the feature quantity-based compliance knowledge DB (database) 33, a catalog storage unit 34, and a catalog updating unit 38. Note that, the server device 30 can be realized by a computer including a CPU, a RAM, a ROM, storage, a communication I/F, and the like.

The communication unit 31 performs communication with the sensor edge device 20 via the network 3 by wired communication or predetermined wireless communication.

The catalog control unit 32 receives machine tool information of the machine tool 1 to be subjected to the state determination, which is input by the user using the input and display device 40. The machine tool information includes information of at least one of a facility type, a processing type, a work material, a cutting tool, and the like of the machine tool 1.

Further, the catalog control unit 32 specifies the catalog corresponding to the machine tool information input by the user by referring to the relationship table 500 (FIG. 7) stored in the feature quantity-based compliance knowledge DB 33. Further, the catalog control unit 32 retrieves and acquires the sensor parameter 100, the feature quantity information 200, and the processing algorithm information 300 configuring the specified catalog from the catalog storage unit 34, and supplies the sensor parameter 100, the feature quantity information 200, and the processing algorithm information 300 to the sensor edge device 20 via the communication unit 31 and the network 3.

The feature quantity-based compliance knowledge DB 33 holds a combination of information of a plurality of items such as a facility type, a processing type, a work material, and a cutting tool of the machine tool 1 and a relationship table 500 associated with the catalog.

FIG. 7 shows an example of the relationship table 500. In the example shown in the same drawing, the facility type is described as the machine tool information, and the feature quantity distribution 200 and the processing algorithm information 300 are described in the catalog corresponding to the facility type.

Return to FIG. 1. The catalog storage unit 34 includes a sensor parameter DB 35, the feature quantity information DB 36, and a processing algorithm DB 37.

The sensor parameter DB 35 holds the sensor parameter 100 that the sensor control unit 23 of the sensor edge device 20 sets for the sensor 2. The feature quantity information DB 36 holds the feature quantity distribution 200 supplied to the feature quantity tuning unit 24 of the sensor edge device 20. The processing algorithm DB 37 holds the processing algorithm information 300 supplied by the sensor data processing unit 25 of the sensor edge device 20.

The catalog updating unit 38 sets the feature quantity distribution 210 after tuning and the processing specification information 400 transmitted from the plurality of sensor edge devices 20 via the network 3 as teacher data, performs reinforcement learning of the original feature quantity distribution 200 stored in the feature quantity information DB 36 corresponding to the feature quantity distribution 210 after tuning, and updates the original feature quantity distribution 200 stored in the feature quantity information DB 36 by the obtained new feature quantity distribution 220 (FIGS. 11(A)-11(B)).

Note that, instead of performing the reinforcement learning, the feature quantity distribution 200 held in the feature quantity information DB 36 may be overwritten by the feature quantity distribution 210 after tuning. Further, a difference between the feature quantity distributions 200 held in the feature quantity information DB 36 and the feature quantity distribution 210 after tuning may be held in the feature quantity information DB 36.

Note that, the updated feature quantity distribution 220 is again supplied to the plurality of sensor edge devices 20 connected via the network 3. In the sensor edge device 20 to which the updated feature quantity distribution 220 is supplied, the updated feature quantity distribution 220 can be used for, for example, abnormality detection or failure sign detection. As for the operating state identification, it is possible to maintain high identification accuracy by using the feature quantity distribution 210 after tuning held by the sensor edge device 20.

The input and display device 40 is formed of, for example, a personal computer, receives an input operation of the machine tool information from the user, and notifies the server device 30 of the operation.

The production management device 50 executes efficient production management based on the state determination result of the plurality of machine tools 1 and the timestamps notified from the plurality of sensor edge devices 20 via the network 3. The production management device 50 is also referred to as, for example, a Manufacturing Execution System (MES) or an Enterprise Resource Planning (ERP) system.

Note that, although the sensor edge device 20, the server device 30, and the input and display device 40 have been described as individual devices in the present embodiment, all or part of the sensor edge device 20, the server device 30, and the input and display device 40 may be combined into one device. For example, the agent control unit 22, the sensor control unit 23, the feature quantity tuning unit 24, the sensor data processing unit 25, the catalog control unit 32, the feature quantity-based compliance knowledge DB 33, the catalog storage unit 34, and the catalog updating unit 38 may be combined to configure a facility state determination device.

<Processing at Time of Starting Up>

Next, FIG. 8 is a flowchart illustrating an example of the processing at the time of starting up by the facility management system 10.

The processing at the time of starting up is executed when the machine tool 1, the sensor 2, and the sensor edge device 20 are newly added to the facility management system 10. It is assumed that a catalog generated in advance is stored in the catalog storage unit 34 of the server device 30 as a premise of the processing at the time of starting up.

First, the catalog control unit 32 receives the machine tool information related to the added machine tool 1 input by the user using the input and display device 40. Then, the catalog control unit 32 specifies the catalog corresponding to the machine tool information input by the user by referring to the relationship table 500 stored in the feature quantity-based compliance knowledge DB 33, retrieves and acquires the sensor parameter 100, the feature quantity information 200, and the processing algorithm information 300 configuring the specified catalog from the catalog storage unit 34 (step S1).

Note that, instead of the user inputting the machine tool information by using the input and display device 40, for example, the sensor control unit 23 of the sensor edge device 20 may generate the machine tool information based on information obtained from the machine tool 1 or the sensor 2, and notify the server device 30 of the machine tool information.

Next, the catalog control unit 32 outputs the catalog (the sensor parameter 100, the feature quantity information 200, and the processing algorithm information 300) acquired from the catalog storage unit 34 to the communication unit 31. The communication unit 31 transmits the catalog from the catalog control unit 32 to the sensor edge device 20 via the network 3 (step S2). The catalog transmitted from the communication unit 31 is received by the communication unit 21 of the sensor edge device 20 and output to the agent control unit 22.

Next, the agent control unit 22 of the sensor edge device 20 supplies the sensor parameter 100 included in the catalog from the server device 30 to the sensor control unit 23, supplies the feature quantity information 200 to the feature quantity tuning unit 24, and supplies the processing algorithm information 300 to the sensor data processing unit 25 (step S3). The processing at the time of starting up is ended now.

According to the processing at the time of starting up described above, the sensor control unit 23, the feature quantity tuning unit 24, and the sensor data processing unit 25 can perform respective operation preparation. Therefore, the sensor edge device 20 can perform the state determination of the machine tool 1 thereafter.

<Feature Quantity Distribution Tuning Processing>

Next, FIG. 9 is a flowchart illustrating an example of feature quantity distribution tuning processing by the sensor edge device 20.

The feature quantity distribution tuning processing is executed in parallel with the state determination of the machine tool 1 by the sensor edge device 20.

First, the sensor control unit 23 acquires the sensor data detected from the machine tool 1 by the sensor 2 and outputs the acquired sensor data to the feature quantity tuning unit 24 (step S11).

Next, the feature quantity tuning unit 24 extracts the feature quantity from the sensor data, and maps the extracted feature quantity (new data) to the held feature quantity distribution 200 (or feature quantity distribution 210) (step S12). Next, the feature quantity tuning unit 24 calculates a distance between the new data and each feature quantity (past data) existing in the held feature quantity distribution 200 (or feature quantity distribution 210) (step S13).

Note that, for the processing of steps S11 to S13 described above, the result of the processing performed for the state determination of the machine tool 1 being executed in parallel may be diverted.

Next, by adding the new data to the held feature quantity distribution 200 and incorporating the new data and the past data which is closest to the new data into the same cluster, the feature quantity tuning unit 24 tunes the feature quantity distribution 200 (or the feature quantity distribution 210), and updates the held feature quantity distribution 200 (or the feature quantity distribution 210) by the feature quantity distribution 210 after tuning (step S14).

The feature quantity distribution tuning processing is ended now. Thereafter, in the state determination of the machine tool 1, the feature quantity distribution 210 after tuning held by the feature quantity tuning unit 24 is used. Therefore, the accuracy of the state determination can be expected to be improved thereafter.

<Catalog Update Processing>

Next, FIG. 10 is a flowchart illustrating an example of catalog update processing by the server device 30.

The catalog update processing is executed, for example, when the feature quantity distribution 210 after tuning tuned by the sensor edge device 20 and the processing specification information 400 are transmitted from the sensor edge device 20.

First, the communication unit 31 of the server device 30 receives the feature quantity distribution 210 after tuning and the processing specification information 400 transmitted from the sensor edge device 20, and outputs the feature quantity distribution 210 after tuning and the processing specification information 400 to the catalog control unit 32 and the catalog updating unit 38 (step S21).

Next, the catalog control unit 32 refers to the relationship table 500 of the feature quantity-based compliance knowledge DB 33, specifies the catalog corresponding to the processing specification information 400, and specifies the original feature quantity distribution 200 corresponding to the feature quantity information (feature quantity distribution) 200 included in the catalog, that is, the feature quantity distribution 210 after tuning transmitted from the sensor edge device 20. Further, the catalog control unit 32 retrieves and acquires the specified original feature quantity distribution 200 from the feature quantity information DB 36 of the catalog storage unit 34 and outputs the specified original feature quantity distribution 200 to the catalog updating unit 38 (step S22).

Next, the catalog updating unit 38 sets the feature quantity distribution 210 after tuning and the processing specification information 400 transmitted from the sensor edge device 20 as the teacher data, and performs reinforcement learning of the original feature quantity distribution 200 corresponding to the feature quantity distribution 210 after tuning (step S23).

FIGS. 11(A)-11(B) show examples of the feature quantity distribution 200 before and after reinforcement learning. FIG. 11(A) shows an example of the feature quantity distribution 200 before reinforcement learning. FIG. 11(B) shows an example of the feature quantity distribution 220 after reinforcement learning.

It can be seen that the area of the cluster 202 in the feature quantity distribution 220 after the reinforcement learning shown in FIG. 11(B) is increased, as compared with the feature quantity distribution 200 shown in FIG. 11(A). The increase in the area of the cluster 202 is a result of reflecting the feature quantity distribution 210 after tuning transmitted from each sensor edge device 20 by the reinforcement learning.

Return to FIG. 10. Next, the catalog updating unit 38 updates (overwrites) the original feature quantity distribution 200 stored in the feature quantity information DB 36 by the new feature quantity distribution 220 obtained as a result of the reinforcement learning (step S24). The catalog update processing is ended now.

As described above, the catalog update processing is performed each time the feature quantity distribution 210 after tuning from the plurality of sensor edge devices 20 connected via the network 3 is transmitted. Therefore, the feature quantity distribution 200 held in the feature quantity information DB 36 reflects the feature quantity distribution 210 after tuning from the plurality of sensor edge devices 20 provided in respective machine tools 1 of the same facility type. Therefore, according to the catalog update processing, the versatility and reliability of the feature quantity distribution 200 held in the feature quantity information DB 36 can be enhanced.

Note that, in the catalog update processing described above, the new feature quantity distribution 220 obtained as a result of the reinforcement learning is added to the feature quantity information DB 36 and held without updating (overwriting) the original feature quantity distribution 200 stored in the feature quantity information DB 36, and a corresponding relationship between the new catalog including the new feature quantity distribution 220 and a combination of information of each item included in the processing specification information 400 may be added to the relationship table 500 of the feature quantity-based compliance knowledge DB 33.

As described above, according to the facility management system 10 according to the embodiment of the invention, in each sensor edge device 20, the feature quantity distribution 200 included in the catalog which has versatility and is supplied from the server device 30 can be separately tuned and used for the state determination. Therefore, the accuracy of the state determination in each sensor edge device 20 can be improved.

Further, the server device 30 can perform the reinforcement learning of the feature quantity distribution 200 held as a catalog by setting the feature quantity distribution 210 after tuning transmitted from each of the sensor edge devices 20 as teaching data, and can update the feature quantity distribution 200 that has been held so far by the feature quantity distribution 220 obtained as a result of the reinforcement learning. Therefore, the server device 30 can supply a catalog with enhanced versatility to the sensor edge device 20.

Further, since the catalog with enhanced versatility can be supplied to the sensor edge device 20, it is possible to easily add the machine tool 1 and the sensor edge device 20, and the production management device 50 can grasp the state of the plurality of machine tools 1 via the network 3. Therefore, the facility management system 10 can contribute to the Internet of Things (IoT) as a whole factory.

Note that, the effects described in the present specification are merely examples and are not limited and other effects may be obtained.

The invention is not limited to the embodiment described above and includes various modifications. For example, the embodiment described above has been described in detail for easy understanding of the invention, and the invention is not necessarily limited to include all the constituent elements described above. Further, a part of the configuration of an embodiment can be replaced with the configuration of another embodiment, and the configuration of another embodiment can be added to the configuration of one embodiment. Further, a part of the configuration of each embodiment may be added, deleted, or replaced with another configuration.

REFERENCE SIGN LIST 1 machine tool
2 sensor
3 network
10 facility management system
20 sensor edge device
21 communication unit
22 agent control unit
23 sensor control unit
24 feature quantity tuning unit
25 sensor data processing unit
30 server device
31 communication unit
32 catalog control unit
33 feature quantity-based compliance knowledge DB
34 catalog storage unit
35 sensor parameter DB
36 feature quantity information DB
37 processing algorithm DB
38 catalog updating unit
40 input and display device
50 production management device
100 sensor parameter
200 feature quantity information (feature quantity distribution)
201~203 cluster
210 feature quantity distribution
220 feature quantity distribution
300 processing algorithm information
400 processing specification information
500 relationship table

The invention claimed is:

1. A facility state determination device comprising:
a catalog storage unit that stores a catalog having versatility for machine tools of a same facility type, the catalog including of a sensor parameter, a feature quantity distribution, and processing algorithm information;
a catalog control unit that specifies the catalog corresponding to a target machine tool to be subjected to state determination based on machine tool information including at least an item of the facility type and acquires the catalog corresponding to the target machine tool from the catalog storage unit;
a feature quantity extraction unit that extracts a feature quantity from sensor data detected from the target machine tool;
a sensor data processing unit that:
  performs the state determination of the target machine tool based on feature quantity distribution included in the acquired catalog and the feature quantity extracted from the sensor data, and
  performs clustering of the feature quantity extracted from the sensor data in the feature quantity distribution according to processing algorithm information included in the acquired catalog and performs the state determination of the target machine tool, each cluster is labeled a different operating state of the machine tool, the operating states comprising a stopped state, an idling state, and a cutting state;
a feature quantity tuning unit that performs tuning on the feature quantity distribution by mapping the feature quantity extracted from the sensor data to the feature quantity distribution; and
a catalog updating unit that updates the catalog stored in the catalog storage unit based on the feature quantity distribution after tuning.

2. The facility state determination device according to claim 1 further comprising:

a sensor control unit that performs a setting of a sensor attached to the target machine tool based on the sensor parameter included in the acquired catalog.

3. The facility state determination device according to claim 2, wherein
the catalog control unit specifies the catalog corresponding to the target machine tool based on the machine tool information generated by the sensor control unit.

4. The facility state determination device according to claim 1, wherein
the sensor data processing unit performs operating state identification as the state determination of the target machine tool.

5. The facility state determination device according to claim 1, wherein
the sensor data processing unit performs abnormality detection as the state determination of the target machine tool.

6. The facility state determination device according to claim 1, wherein
the sensor data processing unit performs failure sign detection as the state determination of the target machine tool.

7. The facility state determination device according to claim 1, wherein
the catalog updating unit updates the catalog stored in the catalog storage unit by performing reinforcement learning of the feature quantity distribution included in the catalog stored in the catalog storage unit as teacher data after tuning.

8. The facility state determination device according to claim 1, wherein
the catalog control unit specifies the catalog corresponding to the target machine tool based on the machine tool information input from a user.

9. A facility state determination method of a facility state determination device, comprising:
storing a catalog having versatility for machine tools of a same facility type in a catalog storage unit, the catalog including of a sensor parameter, a feature quantity distribution, and processing algorithm information;
specifying the catalog corresponding to a target machine tool to be subjected to state determination based on machine tool information including at least an item of the facility type and acquiring the catalog corresponding to the target machine tool from the catalog storage unit;
extracting a feature quantity from sensor data detected from the target machine tool;
performing the state determination of the target machine tool based on the feature quantity distribution included in the acquired catalog and the feature quantity extracted from the sensor data, wherein performing the state determination comprises clustering the feature quantity extracted from the sensor data in the feature quantity distribution according to processing algorithm information included in the acquired catalog and performs the state determination of the target machine tool, each cluster is labeled a different operating state of the machine tool, the operating states comprising a stopped state, an idling state, and a cutting state;
tuning the feature quantity distribution by mapping the extracted feature quantity to the feature quantity distribution; and
updating the catalog stored in the catalog storage unit based on the feature quantity distribution after tuning.

10. A facility management system comprising:
a plurality of sensor edge devices that are provided corresponding to a plurality of machine tools; and
a server device that is connected to the sensor edge device via a network, wherein
the server device includes
a catalog storage unit that stores a catalog having versatility for the machine tool of a same facility type, the catalog including of a sensor parameter, a feature quantity distribution, and processing algorithm information;
a catalog control unit that specifies the catalog corresponding to a target machine tool to be subjected to state determination based on machine tool information including at least an item of the facility type and acquires the catalog corresponding to the target machine tool from the catalog storage unit; and
a catalog updating unit that updates the catalog stored in the catalog storage unit based on feature quantity distribution after tuning tuned by the sensor edge device, and
the sensor edge device includes
a feature quantity extraction unit that extracts a feature quantity from the sensor data detected from the target machine tool;
a sensor data processing unit that:
performs the state determination of the target machine tool based on the feature quantity distribution included in the catalog supplied from the server device and the feature quantity extracted from the sensor data, and
performs clustering of the feature quantity extracted from the sensor data in the feature quantity distribution according to processing algorithm information included in the acquired catalog and performs the state determination of the target machine tool, each cluster is labeled a different operating state of the machine tool, the operating states comprising a stopped state, an idling state, and a cutting state; and
a feature quantity tuning unit that performs tuning of the feature quantity distribution by mapping the feature quantity extracted from the sensor data to the feature quantity distribution.

11. The facility management system according to claim 10 further comprising:
a production management device that performs production management using the plurality of machine tools based on a result of the state determination of the corresponding target machine tool transmitted from each of the plurality of sensor edge devices.

* * * * *